(12) United States Patent
Dimotsis et al.

(10) Patent No.: US 6,750,259 B2
(45) Date of Patent: Jun. 15, 2004

(54) PROCESS FOR PREPARING GEL-TYPE CATION EXCHANGERS

(75) Inventors: George L. Dimotsis, Lansdale, PA (US); Wolfgang Podszun, Cologne (DE); Reinhold Klipper, Cologne (DE)

(73) Assignees: Bayer Aktiengesellschaft, Leverkusen (DE); Sybron Chemicals, Inc., Birmingham, NJ (US)

(*) Notice: Subject to any disclaimer, the term of this patent is extended or adjusted under 35 U.S.C. 154(b) by 0 days.

(21) Appl. No.: 10/191,386

(22) Filed: Jul. 8, 2002

(65) Prior Publication Data

US 2004/0006145 A1 Jan. 8, 2004

(51) Int. Cl.$^7$ .................................................. C08F 8/34
(52) U.S. Cl. ........................................................ 521/33
(58) Field of Search ............................................ 521/33

(56) References Cited

U.S. PATENT DOCUMENTS

| | | | | |
|---|---|---|---|---|
| 4,258,700 A | * | 3/1981 | Vaseen | 126/433 |
| 4,483,357 A | * | 11/1984 | Rao | 137/3 |
| 4,500,652 A | | 2/1985 | Misaka et al. | 521/33 |
| 4,564,644 A | * | 1/1986 | Harris | 521/28 |
| 5,277,247 A | * | 1/1994 | Cameron | 165/159 |
| 5,429,764 A | * | 7/1995 | Van Vlahakis | 252/146 |
| 6,228,896 B1 | | 5/2001 | Bachmann et al. | 521/33 |
| 6,365,683 B2 | * | 4/2002 | Podzun | 526/80 |
| 6,492,271 B1 | * | 12/2002 | Uozumi | 438/689 |
| 2002/0022671 A1 | | 2/2002 | Klipper et al. | 521/33 |
| 2002/0153323 A1 | | 10/2002 | Podszun et al. | 210/681 |

FOREIGN PATENT DOCUMENTS

| | | |
|---|---|---|
| DE | 1227431 | 10/1966 |
| DE | 1233143 | 1/1967 |
| GB | 997290 | 7/1975 |

* cited by examiner

Primary Examiner—Bernard Lipman
(74) Attorney, Agent, or Firm—Godfried R. Akorli; Diderico van Eyl

(57) ABSTRACT

The invention relates to a process for preparing gel-type cation exchangers of high stability by sulfonation of crosslinked (meth)acrylic ester-containing bead polymers with sulfuric acid having a concentration of 90 to 95% in the absence of a swelling agent.

3 Claims, No Drawings

PROCESS FOR PREPARING GEL-TYPE CATION EXCHANGERS

BACKGROUND OF THE INVENTION

The invention relates to a process for preparing strongly acidic gel-type cation exchangers of high stability by sulfonation, without a swelling agent, of (meth)acrylic ester-containing bead polymers.

Cation exchangers may be obtained by functionalizing crosslinked styrene bead polymers. In the functionalization, by reacting aromatic units of the polymer backbone with a sulfonating agent, for example, sulfuric acid, covalently bound sulfonic acid groups are produced.

Because of the differing polarity of the bead polymer and the sulfonating agent, the reaction of the bead polymer with the sulfonating agent is inhibited or greatly retarded. For this reason, generally, a swelling agent is added to improve the reaction kinetics. Suitable swelling agents in this context are primarily chlorinated swelling agents, such as dichloromethane, dichloroethane, or dichloropropane.

The use of chlorinated compounds as swelling agents in sulfonation is undesirable for economic reasons and particularly for ecological reasons.

There has been no lack of attempts to provide bead polymers that can be sulfonated to give strongly acid cation exchangers without addition of swelling agents. Thus, DE-AS 1,233,143, DE-AS 1,227,431, and GB 997,290 describe acrylonitrile-containing bead polymers for sulfonation free of swelling agent. The use of acrylonitrile as comonomer, however, is less expedient for ecological and toxicological reasons.

Other methods for preparing sulfonated beads are known, such as disclosed in copending application Ser. No. 10/059,650. In addition, U.S. Pat. No. 4,500,652 discloses a process for preparing cation exchangers in which the polymerized suspensions of styrene, divinylbenzene, and (meth)acrylic acid or alkyl (meth)acrylate are sulfonated without swelling agent. However, the process described in U.S. Pat. No. 4,500,652 requires as sulfonating agent sulfuric acid at a concentration of 95 to 100%. The use of sulfuric acid at this high concentration is inexpedient, because the reuse of the waste sulfuric acid produced in the sulfonation, which inherently has a lower concentration, is greatly limited. A further disadvantage is the isothermal temperature profile of, for example, 5 hours at 100° C., which requires high expenditure on control technology and high energy consumption. In addition, the proportion of broken beads in products according to U.S. Pat. No. 4,500,652 at 5 to 10% is considerable.

A problem in known cation exchangers is their sometimes inadequate stability under stress. Thus, cation exchange beads can fracture due to mechanical or osmotic forces. For all applications of cation exchangers it is necessary that in the bead shape they must retain their habit and must not be partially or completely broken down in use or disintegrate into fragments. Fragments and bead polymer splinters can, during purification, pass into the solutions to be purified and themselves contaminate these solutions. In addition, the presence of damaged polymer beads is inexpedient for the functioning of the cation exchangers themselves when used in column processes. Splinters lead to an increased pressure drop over the column system and thus decrease the throughput through the column of liquid to be purified.

It is an object of the present invention, therefore, to provide a simple, robust, and economic process for preparing gel-type cation exchangers of high stability.

SUMMARY OF THE INVENTION

The object is achieved by, and the present invention relates to, a process for preparing gel-type cation exchangers of high stability comprising sulfonating (meth)acrylic ester-containing crosslinked bead polymers in the absence of a swelling agent using sulfuric acid having a concentration of from 90 to 95% by weight, wherein the temperature during the sulfonation is increased by the heat of reaction and/or heat of dilution that occurs during the process up to an end temperature of 150 to 170° C.

DETAILED DESCRIPTION OF THE INVENTION

Suitable (meth)acrylic ester-containing crosslinked bead polymers according to the invention are copolymers of styrene, divinylbenzene, and (meth)acrylic esters.

(Meth)acrylic esters, for the purposes of the present invention, are the esters of acrylic acid or methacrylic acid. Those which are preferred according to the invention are $C_1$–$C_4$-alkyl or $C_1$–$C_4$-hydroxyalkyl esters. Particularly preferred (meth)acrylic esters are methyl acrylate, ethyl acrylate, n-propyl acrylate, isopropyl acrylate, hydroxyethyl acrylate, hydroxypropyl acrylate, methyl methacrylate, ethyl methacrylate, hydroxyethyl methacrylate, and hydroxypropyl methacrylate. Methyl acrylate is particularly preferably used.

The copolymerized divinylbenzene content in the bead polymer is 2 to 20% by weight, preferably 4 to 12% by weight, particularly preferably 6 to 10% by weight. Technical-grade qualities of divinylbenzene can be used to prepare the bead polymer that, in addition to the isomers of divinylbenzene, contain customary by-products such as ethylvinylbenzene. According to the invention, technical-grade qualities having divinylbenzene contents of 55 to 85% by weight are particularly highly suitable.

(Meth)acrylic ester is present in the bead polymer in copolymerized form in amounts of 1 to 8% by weight, preferably 2 to 6% by weight.

The bead polymers that are suitable according to the invention are prepared by the known method of suspension polymerization. In this case, to a mixture of styrene, divinylbenzene, and (meth)acrylic ester is added at least one free-radical former in an aqueous phase that contains a dispersant, and the mixture is divided into droplets with stirring and cured at elevated temperature.

A particular embodiment of the present invention uses a bead polymer in the preparation of which a mixture of free-radical initiators of differing decomposition temperatures was used. Those which are highly suitable are, for example, mixtures of dibenzoyl peroxide or tert-butyl peroxybenzoate or mixtures of tert-butyl peroxy-2-ethylhexanoate and tert-butyl peroxybenzoate. It is particularly advantageous to increase the polymerization temperature with advancing polymerization conversion rate, for example, from an initial temperature of 60 to 70° C. to a final temperature of 90 to 150° C.

A further particular embodiment of the present invention uses a bead polymer in the preparation of which a water-soluble cellulose derivative is used as dispersant. Those which are highly suitable are cellulose esters or cellulose ethers, such as carboxymethyl cellulose, hydroxyethyl cellulose, or hydroxyethyl methyl cellulose. The initial amount of cellulose derivative is generally 0.05 to 1%, based on the water phase, preferably 0.1 to 0.5%.

The particle size of the bead polymer is 100 to 1000 μm, preferably 200 to 500 μm. Not only bead polymers having a wide particle size distribution, but also those having a narrow particle size distribution—or monodisperse bead polymers—can be used. Monodisperse in the context of the present invention means that the quotient of the 90% value and the 10% value of the volume distribution function is less than 2, preferably less than 1.5, particularly preferably less than 1.25.

The bead polymers to be used as starting material according to the invention can have a substantially homogeneous network structure. Those which are preferably suitable according to the invention are also bead polymers having what is termed an IPN structure (InterPenetrating Network), which may be produced by the seed/feed process known from the prior art.

The crosslinked bead polymers are converted to cation exchangers by sulfonation. The sulfonating agent is a sulfuric acid having a concentration of 90 to 95%. It is advantageous to adjust the required acid concentration by admixing sulfuric acid of a higher and a lower concentration, in which case the sulfuric acid of lower concentration that is used is recovered sulfuric acid from earlier sulfonation reactions. The sulfuric acid is preferably mixed in the sulfonation reactor in the presence of the bead polymer to be sulfonated, so that the heat of mixing that occurs is used to heat the reaction mixture.

Surprisingly, it has been found that the temperature profile during the sulfonation is critically important to achieve the inventive effect. In the inventive process, therefore, the sulfonation is initiated at temperatures of 40 to 120° C. (preferably 50 to 150° C.) and increased, by exploiting the heat of mixing and/or heat of reaction, to 150 to 170° C. (preferably to 155 to 165° C.).

The ratio of sulfuric acid to bead polymer is 2.5 to 5 ml/g, preferably 2.6 to 4 ml/g, particularly preferably 2.8 to 3.5 ml/g.

In the sulfonation, the reaction mixture is stirred. For this, various agitator types, such as blade, anchor, gate, or turbine agitators, can be used.

After sulfonation, the reaction mixture of sulfonation product and residual acid is cooled to room temperature and diluted first with sulfuric acids of decreasing concentration and then with water.

If desired, the cation exchanger obtained according to the invention can be treated with deionized water in the H form for purification at temperatures of 70 to 180° C. (preferably 105 to 130° C.).

For many applications it is expedient to convert the inventively prepared cation exchanger from the acid form to the sodium form. This conversion is performed using sodium hydroxide solution at a concentration of 2 to 60% by weight (preferably 4 to 10% by weight) or with aqueous sodium chloride solutions that are 1 to 25% strength by weight (preferably 4 to 10% strength by weight) sodium chloride.

After the conversion, the cation exchangers, for further purification, can be treated with deionized water or aqueous salt solutions, for example, with sodium chloride or sodium sulfate solutions. It has been found here that the treatment at 70 to 150° C. (preferably 120 to 135° C.) is particularly effective and does not reduce the capacity of the cation exchanger.

However, the present invention also relates to gel-type cation exchangers of high stability obtainable by sulfonation of (meth)acrylic ester-containing crosslinked bead polymers in the absence of swelling agents using a sulfuric acid having a concentration of 90 to 95%, during which sulfonation the temperature is increased by the heat of reaction and/or heat of dilution that occurs during the process up to a final temperature of 150 to 170° C.

The cation exchangers obtained by the inventive process are distinguished by particularly high stability. Even after relatively long-term use and repeated regeneration they display no defects on the ion-exchange spheres.

The inventive cation exchangers can be used in a multiplicity of different applications. Thus, for example, they can be used in drinking water treatment, in the production of power station water and ultrapure water (necessary in production of microchips for the computer industry), for the chromatographic separation of sugars (preferably of glucose or fructose), and as catalysts for various chemical reactions (for example, in the preparation of bisphenol A from phenol and acetone).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Test Methods

Original Stability as Represented by the Number of Perfect Beads After Preparation 100 beads are viewed under the microscope. The number of beads that have cracks or show splintering is determined. The number of perfect beads results from the difference between the number of damaged beads and 100.

Stability of Cation Exchangers as Determined by Alkali Shock 5 ml of cation exchanger in the H form are placed in a 100 ml glass beaker. At room temperature, 20 ml of 50% strength by weight sodium hydroxide solution are added. The mixture is stirred and allowed to stand overnight. A representative sample of this is taken, transferred to a Petri dish, and photographed under a microscope. 100 beads are enumerated on the photograph. The number of perfect undamaged beads out of 100 is counted.

Example 1

Preparation of an Acrylic Ester-containing Bead Polymer

The aqueous phase consisting of 1119.04 g of deionized water, 125.00 g of 2% strength methyl hydroxyethyl cellulose solution, and 5.69 g of $Na_2HPO_4.12H_2O$ was placed in 4 liter vessel with a plane ground glass joint connected to a gate agitator, cooler, and temperature sensor equipped with thermostat and chart recorder. The agitator speed was set to 240 rpm and the charge was stirred. Then, a prepared monomer mixture of 1019.32 g of styrene, 193.18 g of 55% strength divinylbenzene, 37.50 g of methyl acrylate, 3.75 g of pure dibenzoyl peroxide, and 3.75 g of tert-butyl benzoate was introduced into the reactor below the surface via an elongated funnel. Nitrogen was passed over the mixture for 15 minutes at 20 liter/h. The mixture was heated to 63° C. in 1.5 h and held at 63° C. for 9 h. The temperature was then elevated to 94° C. over the course of 1 h and held at 94° C. for 2 h. Thereafter the mixture was cooled to room temperature over the course of 2 h. The entire batch was transferred to a 6 liter autoclave and heated to 130° C. over the course of 3 h, held at 130° C. for 2 h, and thereafter cooled back to room temperature. The batch was thoroughly washed over a 100 µm sieve and dried at 80° C. in a drying cabinet. A yield of 93.4% was obtained, with an average particle size of 470 µm.

Example 2

Preparation of Cation Exchangers
Sulfonation without Swelling Agent
Apparatus: 1 liter jacketed vessel, intensive cooler, agitator, thermocouple, and programmable Julabo thermostat 103.5 grams of 78% strength by weight sulfuric acid were placed in the reactor at room temperature and the charge was heated to 80° C. with stirring. Then 50 grams of bead polymer from Example 1 were added over the course of 2 minutes. 193 grams of 100% strength sulfuric acid were then added over 5 minutes, which gave a sulfuric acid concentration of 92%. In 1 hour the temperature was allowed to increase to 110° C. and the mixture was stirred for a further 2 hours at 110° C. The temperature was then increased over the course of 1 hour to 150° C. and the mixture was stirred at 150° C. for a further 4 hours and then cooled over the course of 2 hours to room temperature. The product was flushed into a glass column using 78% strength by weight sulfuric acid. There, in each case over the course of 15 minutes, 2 bed volumes each of 78% strength by weight, 70% strength by weight, 55% strength by weight, and 30% strength by weight sulfuric acid were passed through the resin. The resin was then washed with deionized water until the effluent had a pH of approximately 5.

Yield of H form: 230 ml
Conversion of the Resin from the H to the Na Form 180 ml of resin in the H form were flushed with water into a column. At room temperature, over the course of 4 hours, 800 ml of 4% strength by weight sodium hydroxide solution were passed through the column. The resin was then washed from the top with demineralized water until the pH of the effluent water was approximately 8 to 9. Any fines still present were removed by screening.

Yield Na form: 174 ml
Original stability:
Number of entire beads: 99%
Number of broken beads: 1%
Alkali shock stability:
Number of entire beads: 99%
Number of broken beads: 1%
Total capacity Na form: 1.95 mol/l Example 3

Preparation of Cation Exchangers
Sulfonation without Swelling Agent
Apparatus: 1 liter jacketed vessel, intensive cooler, agitator, thermocouple, and programmable Julabo thermostat 103.5 grams of 78% strength by weight sulfuric acid were placed in the reactor at room temperature and the charge was heated to 80° C. with stirring. Then 50 grams of bead polymer from Example 1 were added over the course of 2 minutes. 193 grams of 100% strength sulfuric acid were then added over 5 minutes, which gave a sulfuric acid concentration of 92%. In 1 hour the temperature was allowed to increase to 110° C. and the mixture was stirred for a further 2 hours at 110° C. The temperature was then increased over the course of 1 hour to 155° C. and the mixture was stirred at 155° C. for a further 3 hours and then cooled over the course of 2 hours to room temperature. The product was flushed into a glass column using 78% strength by weight sulfuric acid. There, in each case over the course of 15 minutes, 2 bed volumes each of 78% strength by weight, 70% strength by weight, 55% strength by weight and 30% strength by weight sulfuric acid were passed through the resin. The resin was then washed with deionized water until the effluent had a pH of approximately 5.

Yield H form: 230 ml
Conversion of the Resin from the H to the Na Form 185 ml of resin in the H form were flushed with water into a column. At room temperature, over the course of 4 hours, 800 ml of 4% strength by weight sodium hydroxide solution were passed through the column. The resin was then washed from the top with deionized water until the pH of the effluent water was approximately 8 to 9. Any fines still present were removed by screening.

Yield Na form: 168 ml
Original stability:
Number of entire beads: 98%
Number of broken beads: 2%
Alkali shock stability:
Number of entire beads: 98%
Number of broken beads: 2%
Total capacity Na form: 2.02 mol/l Example 4

Preparation of Cation Exchangers
Sulfonation without Swelling Agent
Apparatus: 1 liter jacketed vessel, intensive cooler, agitator, thermocouple, and programmable Julabo thermostat 103.5 grams of 78% strength by weight sulfuric acid were placed in the reactor at room temperature and the charge was heated to 80° C. with stirring. Then 50 grams of bead polymer from Example 1 were added over the course of 2 minutes. 193 grams of 100% strength sulfuric acid were then added over 5 minutes, which gave a sulfuric acid concentration of 92%. In 1 hour the temperature was allowed to increase to 110° C. and the mixture was stirred for a further 2 hours at 110° C. The temperature was then increased over the course of 1 hour to 160° C. and the mixture was stirred at 160° C. for a further 2.5 hours and then cooled over the course of 2 hours to room temperature. The product was flushed into a glass column using 78% strength by weight sulfuric acid. There, in each case over the course of 15 minutes, 2 bed volumes each of 78% strength by weight, 70% strength by weight, 55% strength by weight, and 30% strength by weight sulfuric acid were passed through the resin. The resin was then washed with deionized water until the effluent had a pH of approximately 5.

Yield H form: 237 ml
Conversion of the Resin from the H to the Na Form 180 ml of resin in the H form were flushed with water into a column. At room temperature, over the course of 4 hours, 800 ml of 4% strength by weight sodium hydroxide solution were passed through the column. The resin was then washed from the top with deionized water until the pH of the effluent water was approximately 8 to 9. Any fines still present were removed by screening.

Yield Na form: 168 ml
Original stability:
Number of entire beads: 97%
Number of broken beads: 3%
Alkali shock stability:
Number of entire beads: 96%
Number of broken beads: 4%
Total capacity Na form: 1.99 mol/l Table 1 summarizes characteristic data of the resins described in Examples 2 to 4.

TABLE 1

| Example | Amount of methyl acrylate in % by weight in the bead polymer | % damaged beads in the original state | % damaged bead after alkali shock |
|---|---|---|---|
| 2 | 3 | 1 | 1 |
| 3 | 3 | 2 | 2 |
| 4 | 3 | 3 | 4 |

What is claimed is:

1. A process for preparing gel-type cation exchangers of high stability comprising sulfonating a (meth)acrylic ester-containing crosslinked bead polymer in the absence of swelling agent using a sulfuric acid having a concentration of from 90 to 95%, wherein the temperature during the sulfonation is increased by the heat of reaction and/or heat of dilution that occurs during the reaction up to an end temperature of 150 to 170° C.

2. A process according to claim 1 wherein the sulfonation is initiated at a temperature of 40 to 120° C. and the end temperature is reached without external heating using the heat of mixing and/or heat of reaction.

3. A process according to claim 1 wherein the sulfuric acid concentration of 90 to 95% is achieved by mixing sulfuric acid having a higher concentration and sulfuric acid having a lower concentration in the sulfonation reactor and wherein the resulting heat of mixing is used to heat the reaction mixture.

* * * * *